US012637374B2

(12) United States Patent
Leung et al.

(10) Patent No.: US 12,637,374 B2
(45) Date of Patent: May 26, 2026

(54) METHOD AND SYSTEM FOR WASTEWATER TREATMENT BY MEMBRANE FILTRATION AND ELECTROCHEMICAL OXIDATION

(71) Applicant: AXINE WATER TECHNOLOGIES INC., Vancouver (CA)

(72) Inventors: Victor Ka Lun Leung, New Westminster (CA); Geoffrey Sean Milburn, Chelsea (CA); Goran Sparica, Vancouver (CA)

(73) Assignee: AXINE WATER TECHNOLOGIES INC., Vancouver (CA)

( * ) Notice: Subject to any disclaimer, the term of this patent is extended or adjusted under 35 U.S.C. 154(b) by 328 days.

(21) Appl. No.: 18/257,849

(22) PCT Filed: Dec. 16, 2021

(86) PCT No.: PCT/US2021/063833
§ 371 (c)(1),
(2) Date: Jun. 15, 2023

(87) PCT Pub. No.: WO2022/133103
PCT Pub. Date: Jun. 23, 2022

(65) Prior Publication Data
US 2024/0092666 A1      Mar. 21, 2024

Related U.S. Application Data

(60) Provisional application No. 63/127,014, filed on Dec. 17, 2020.

(51) Int. Cl.
B01D 61/10          (2006.01)
C02F 1/44           (2023.01)
(Continued)

(52) U.S. Cl.
CPC ................ *C02F 9/00* (2013.01); *B01D 61/10* (2013.01); *C02F 1/441* (2013.01); *C02F 1/444* (2013.01);
(Continued)

(58) Field of Classification Search
CPC .. C02F 9/00; C02F 1/441; C02F 1/444; C02F 1/4672; C02F 2101/12; C02F 2101/30;
(Continued)

(56) References Cited

U.S. PATENT DOCUMENTS 8,828,240 B1 * 9/2014 Schranze ................. C02F 9/00
210/806
2007/0284251 A1 * 12/2007 Zuback ................ B01D 61/425
210/257.2
(Continued)

FOREIGN PATENT DOCUMENTS

CN         105800739 A  *  7/2016  ........... C02F 1/4672
CN         109650653 A     4/2019
WO         2020/201727 A1   10/2020

OTHER PUBLICATIONS

English translation of CN_105800739_A, Jul. 27, 2016. (Year: 2016).*

*Primary Examiner* — Joseph W Drodge
(74) *Attorney, Agent, or Firm* — Seed Intellectual Property Law Group LLP

(57)          ABSTRACT

A system for wastewater treatment comprises a membrane filtration device which receives the stream of pre-treated wastewater from the pre-treatment unit and generates a reject stream which is supplied to an electrochemical oxidation reactor which generates a reactor effluent stream which is divided into a recirculated wastewater stream that is recycled back to the equalization tank and a reactor discharge stream that is discarded from the system. The target fraction ratio between the volume of the recirculated (Continued)

wastewater stream and the volume of the reactor discharge stream is controlled based on the target total dissolved solids amount in the wastewater to be treated, on the amount of regulated organic substances in the wastewater which are treated by the electrochemical oxidation reactor to increase the efficiency of the electrochemical oxidation reactor to a target value and on the composition of the wastewater being discharged from the system.

16 Claims, 3 Drawing Sheets

(51) Int. Cl.

| | | |
|---|---|---|
| *C02F 1/467* | (2023.01) | |
| *C02F 9/00* | (2023.01) | |
| *C02F 101/12* | (2006.01) | |
| *C02F 101/30* | (2006.01) | |

(52) U.S. Cl.

CPC .... *C02F 1/4672* (2013.01); *B01D 2311/2634* (2013.01); *B01D 2311/2684* (2013.01); *C02F 2101/12* (2013.01); *C02F 2101/30* (2013.01); *C02F 2209/10* (2013.01); *C02F 2209/40* (2013.01); *C02F 2301/046* (2013.01); *C02F 2303/22* (2013.01)

(58) Field of Classification Search

CPC .............. C02F 2209/10; C02F 2209/40; C02F 2301/046; C02F 2303/22; C02F 1/66; C02F 5/02; C02F 2101/16; C02F 2101/36; C02F 2303/04; C02F 1/467; C02F 2305/023; C02F 2311/2634; C02F 2311/2684; B01D 61/10; B01D 2311/08; B01D 2311/25; B01D 2311/252; B01D 2311/2523

See application file for complete search history.

(56) References Cited

U.S. PATENT DOCUMENTS

| | | | | |
|---|---|---|---|---|
| 2012/0160753 A1* | 6/2012 | Vora | .......................... | C01D 3/06 |
| | | | | 210/252 |
| 2016/0052813 A1* | 2/2016 | Ninolakis | ............... | C02F 1/004 |
| | | | | 210/638 |
| 2017/0129796 A1* | 5/2017 | Iyer | .................... | B01D 61/0021 |
| 2017/0320765 A1 | 11/2017 | Bigelow et al. | | |
| 2019/0270660 A1* | 9/2019 | Schmidt | ................. | B01D 61/04 |
| 2019/0300411 A1 | 10/2019 | Poirier et al. | | |
| 2021/0094855 A1* | 4/2021 | Schmidt | ............... | B01D 61/423 |

* cited by examiner

METHOD AND SYSTEM FOR WASTEWATER TREATMENT BY MEMBRANE FILTRATION AND ELECTROCHEMICAL OXIDATION

TECHNICAL FIELD

The present invention relates to a system and a method for treating wastewater by membrane filtration assisted by electrochemical oxidation.

BACKGROUND

Wastewater treatment systems are high in demand due to tighter wastewater disposal regulations, whereby industrial facilities are required to eliminate their recalcitrant water pollutants prior to discharge, and due to the current global shortage of clean water. Therefore, there is an increasing demand of cost-effective, sustainable wastewater treatment systems that minimize the addition of chemicals, do not produce secondary pollution, and have minimal operational and maintenance requirements.

The preferred approach to treat recalcitrant wastewater is by electrochemical oxidation, which is a sustainable, safe and highly efficient treatment solution for eliminating a wide variety of pollutants such as persistent organic pollutants, dioxins, nitrogen species (e.g. ammonia), pharmaceuticals, pathogens, microorganisms and others. One approach for treating wastewater is by direct electrochemical oxidation of organic and/or inorganic pollutants whereby such pollutants are oxidized directly on the anode surface. Another method is the indirect electrochemical oxidation of organic and/or inorganic pollutants through the in-situ generation of chemically oxidizing species (such as hydroxyl, chlorine, oxygen or perchlorate radicals or compounds such as hypochlorite, ozone, or hydrogen peroxide). These chemically oxidizing species are generated directly on the anode surface and subsequently oxidize pollutants within the wastewater solution.

In wastewater treatment systems employing electrochemical oxidation the anode catalyst is selected from the group comprising platinum, tin oxide, antimony tin oxide, ruthenium oxide, iridium oxide, niobium doped antimony tin oxide, graphite, manganese oxide, or it can be a more expensive catalyst such as diamond or boron-doped diamond. The electrodes used in wastewater treatment are in general expensive and can increase the cost of the overall system especially for applications where a large amount of organic material has to be removed.

Membrane filtration treatment of wastewater is another known method for removing suspended and dissolved solids, organics and other contaminants from wastewater which produces a reject stream containing high concentrations of suspended and dissolved solids, organics and other contaminants which require a downstream treatment or disposal. Membrane filtration treatments of wastewater can include reverse osmosis, ultrafiltration, nanofiltration or microfiltration.

In the past, the reject stream from the membrane filtration system was treated by electro-oxidation in an electrochemical reactor as mentioned above to remove the organics in the reject stream of the membrane filtration system and the treated wastewater exiting the electrochemical reactor was discarded.

For example, WO2011015556 describes a method for degrading the organic pollutants in industrial wastewater, wherein the organic compounds in the wastewater are first concentrated in two steps, first through nanofiltration or ultrafiltration and then through reverse osmosis and in the end the reject stream is treated by electrolysis. The reject stream from the reverse osmosis process is fed to the electrolysis device when the concentration of the pollutants (COD) in the wastewater is above a predetermined value. This method tries to improve the energy efficiency of the system for treating wastewater.

Similarly, KR101017006 describes a reverse osmosis concentrate treatment apparatus comprising a reverse osmosis concentrate tank storing the reverse osmosis concentrate generated during the treatment of livestock wastewater from where the concentrate is fed to a coagulation tank to remove the organic materials by coagulation and then to an electro-oxidation tank where the wastewater is treated by electrochemical oxidation for removing the residual organic materials and ammonia nitrogen.

It is known to concentrate the organic mass from the wastewater to be treated by using membrane filtration prior to electrochemical oxidation to increase the oxidation treatment efficiency, and then reducing the organic mass in the wastewater treated in the filtration stage in an electrochemical oxidation reactor to achieve a safe discharge.

It is also known to first treat the wastewater through electrochemical oxidation to remove the organic material and further treat the effluent from the electrochemical oxidation process through a membrane filtration process such as reverse osmosis or through electrodialysis in order to remove the other dissolved solids for achieving a potable water level discharge.

In the prior art documents, the electrochemical oxidation reactor is designed to remove most of the organic contaminants from the wastewater reject stream coming from the membrane filtration device, such that the treated water reject stream from the membrane filtration device can be discarded into the environment. This involves having an electrode active area in the reactor that is large enough so that it can treat the wastewater to lower the organics concentration to a degree sufficient for discharge and also to operate the reactor at a higher current density. This implies higher costs for the system due to the cost of the catalysts used for the wastewater treatment and due to the electricity consumption.

Notwithstanding the substantial developments in the art, there remains a continuing need for a more efficient and cost-effective method for treating wastewater, especially wastewater comprising larger amounts of organic matter, by employing a combined membrane filtration and electrochemical oxidation method. The present invention addresses this need while additionally providing other benefits as disclosed herein.

SUMMARY OF THE INVENTION

The present invention describes a wastewater treatment system comprising:
  a first membrane filtration device which receives a stream of wastewater to be treated and generates a first reject stream and a first treated wastewater stream which is discarded from the system; and
  an electrochemical oxidation reactor which receives the first reject stream from the first membrane filtration device and treats it to remove a portion of specific organics from the wastewater generating a reactor effluent stream,
wherein the reactor effluent stream is divided into a recirculated wastewater stream which is recycled back to the first membrane filtration device and a reactor discharge stream which is discarded from the system.

In some embodiments, the stream of wastewater to be treated is supplied first to an equalization tank and further to a pre-treatment unit, before being supplied to the membrane filtration device or just to a pre-treatment unit before being supplied to the membrane filtration device and in these embodiments the recirculated wastewater stream is supplied back to the to the equalization tank and/or to the pre-treatment unit before being supplied to the first membrane filtration device.

In preferred embodiments, the first membrane filtration device is a reverse osmosis device.

In some embodiments, the system further comprises a second membrane filtration device which receives the stream of wastewater to be treated before it is delivered to the first membrane filtration device and generates a second treated wastewater stream which is supplied to the first membrane filtration device, and a second reject stream which is supplied to the electrochemical oxidation reactor for further treatment.

In preferred embodiments, the second membrane filtration device is an ultrafiltration device.

The first and/or the second membrane filtration devices comprise a membrane which is selected to remove specific organic compounds and the electrochemical oxidation reactor comprises at least one electrochemical cell comprising electrodes with catalysts selected to remove specific organic compounds from the wastewater.

In preferred embodiments, the system further comprises control means for adjusting the volume of the reactor discharge stream and the volume of the recirculated wastewater stream at a fraction ratio which depends on a target total dissolved solids in the stream of wastewater to be treated, on the target concentration of the organic compounds in the wastewater to be treated and/or on the composition of the wastewater being discharged from the system.

The target total dissolved solids generally depends on the amount and type of inorganic compounds measured in the stream of wastewater to be treated. The amount of inorganic compounds measured in the wastewater to be treated comprise an amount of desirable inorganic compounds and an amount of undesirable inorganic compounds, wherein the desirable inorganic compounds in the wastewater to be treated comprise compounds for increasing the conductivity of the wastewater to be treated, while the undesirable inorganic compounds in the wastewater to be treated comprise scale forming compounds or halides.

The fraction ratio between the volume of the reactor discharge stream and the volume of the recirculated wastewater stream is adjusted based on the amount of regulated organic substances in the wastewater which are treated by the electrochemical oxidation reactor to increase the efficiency of the electrochemical oxidation reactor to a target value determined based on the contaminant removal rate and the amount of current and energy consumed to operate the electrochemical oxidation reactor.

In some embodiments, the fraction ratio is adjusted at a constant value based on numeric modelling while in other embodiments the fraction ratio is continuously adjusted based on the monitored values of the target total dissolved solids in the stream of wastewater to be treated, the target concentration of organic compounds in the stream of wastewater to be treated and on the composition of the wastewater being discharged from the system.

A method for wastewater treatment by membrane filtration and electrochemical oxidation is further disclosed comprising the steps of:

a. supplying a stream of wastewater to be treated to a membrane filtration device and discarding a stream of wastewater which was treated in the membrane filtration device out of the system;

b. supplying a reject stream from the membrane filtration device to an electrochemical oxidation reactor which treats the reject stream to remove only a portion of specific organics therefrom, generating a reactor effluent stream and discarding the reactor effluent stream from the electrochemical oxidation reactor;

c. supplying a portion of the reactor effluent stream back to the membrane filtration device as a recirculated wastewater stream and discarding the rest of the reactor effluent stream as a reactor discharge stream out of the system or merging it with the stream of wastewater treated in the membrane filtration device to be discarded out of the system; and d. controlling the fraction ratio between volume of the recirculated wastewater stream from the electrochemical oxidation reactor to membrane filtration device and the volume of the reactor discharge stream.

The fraction ratio between the volume of the recirculated wastewater stream from the electrochemical oxidation reactor to the membrane filtration device and the volume of the reactor discharge stream is controlled based on the target total dissolved solids in the stream of wastewater to be treated, on the target concentration of organic compounds in the stream of wastewater to be treated and on the composition of the wastewater being discharged from the system. As mentioned above, the amount of inorganic substances measured in the wastewater to be treated comprise an amount of desirable inorganic substances and an amount of undesirable inorganic substances, wherein the desirable inorganic substances in the wastewater to be treated comprise substances for increasing the conductivity of the wastewater to be treated, and the undesirable inorganic substances in the wastewater to be treated comprise scale forming substances or halides.

In preferred embodiments the target concentration of organic compounds is based on the amount of regulated organic substances in the wastewater which are treated by the electrochemical oxidation reactor to increase the efficiency of the electrochemical oxidation reactor to a target value determined based on the contaminant removal rate and the amount of current and energy consumed to operate the electrochemical oxidation reactor.

The fraction ratio between the volume of the recirculated wastewater stream from the electrochemical oxidation reactor to the membrane filtration device and the volume of the reactor discharge stream can be adjusted at a constant value based on numeric modelling or can be continuously adjusted based on the monitored values of the target total dissolved solids in the stream of wastewater to be treated, on the monitored values of the target concentration of organic compounds in the stream of wastewater to be treated and/or on the monitored composition of the stream of wastewater being discharged from the system.

BRIEF DESCRIPTION OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended.

Figure 1:
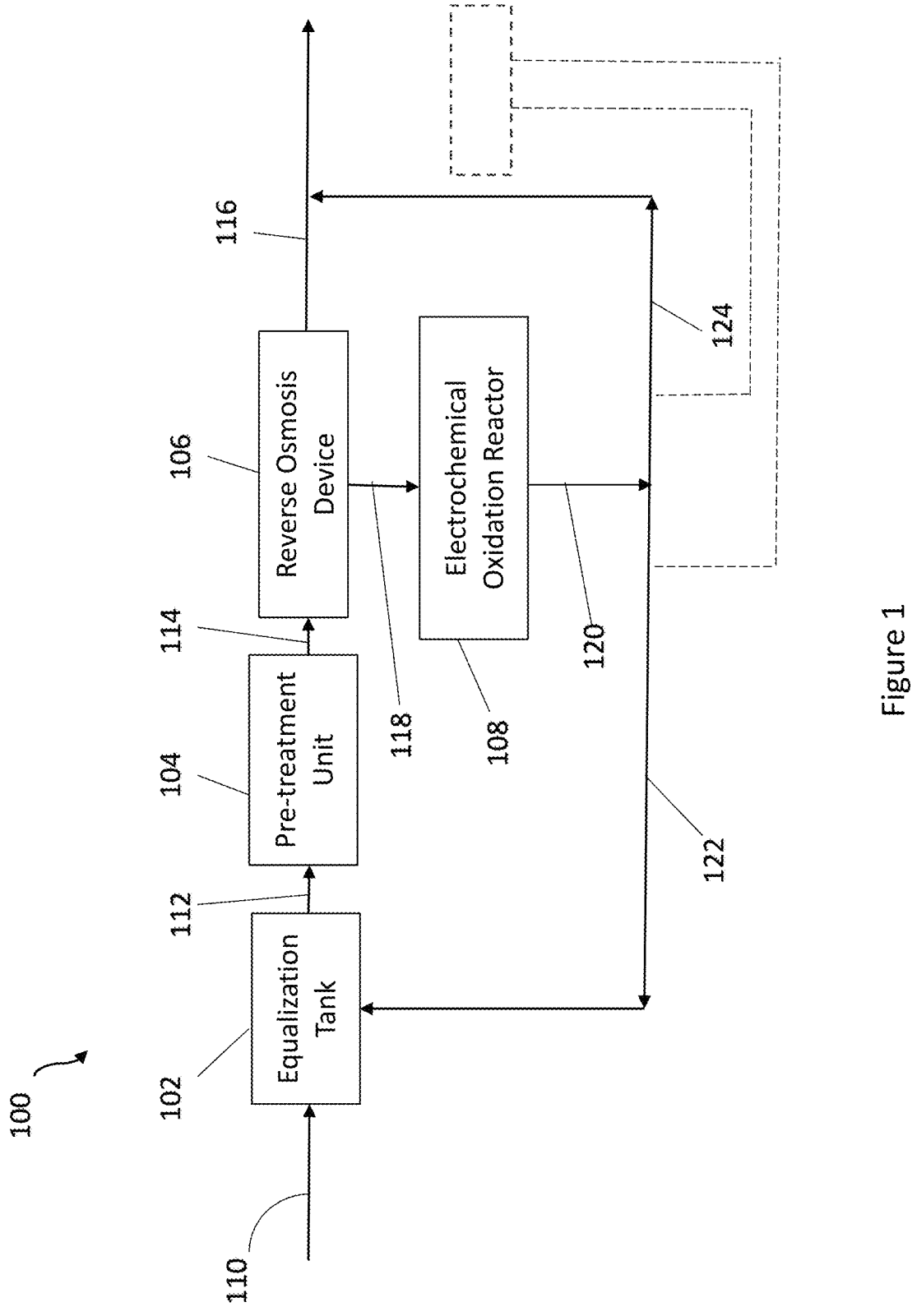
FIG. 1 illustrates a schematic of the first embodiment of the system for treating wastewater according to the present invention.

A wastewater treatment system according to the first embodiment of the present invention is illustrated in FIG. 1.

The electrochemical wastewater treatment system 100 comprises an equalization tank 102, a pre-treatment unit 104, a reverse osmosis device 106 and an electrochemical oxidation reactor 108.

The stream of wastewater to be treated 110 is fed to the equalization tank 102 and the effluent wastewater stream 112 from the equalization tank is pre-treated in the pre-treatment unit 104. The stream of pre-treated wastewater 114 exiting pre-treatment unit 104 is fed to the reverse osmosis device 106. In the embodiment of the present system illustrated in FIG. 1 the membrane filtration unit is a reverse osmosis unit, but a person skilled in the art would easily understand that any other type of filtration device comprising a membrane that separates compounds via molecular size, charge, or by other characteristics can be used, such as a nanofiltration membrane, microfiltration membrane or an ultrafiltration membrane. In the pre-treatment unit the wastewater is pre-treated by adding solutions for increasing the wastewater conductivity, solutions for controlling the pH of the wastewater and/or solutions to prevent the membrane fouling such as a descalant, dechlorinator or biocides. The equalization tank stores the wastewater to be treated allowing the system to draw a consistent amount of wastewater for further treatment in the membrane filtration device and in the electrochemical oxidation reactor.

The stream of pre-treated wastewater 114 is treated in the reverse osmosis device 106 by separating selected soluble and insoluble compounds, including organic compounds to form a treated wastewater stream 116. The membrane pore size and characteristics are selected to retain selected organics. The wastewater that is rejected from the reverse osmosis unit forms a reverse osmosis reject stream 118 which is fed to the electrochemical oxidation reactor 108 where it is electrochemically treated by electro-oxidation and the electrochemically treated wastewater exits the reactor forming a reactor effluent stream 120. The electrochemical oxidation reactor can comprise several electrochemical cells which can use different catalysts for removing specific contaminants in the wastewater, especially specific organic compounds in the wastewater.

A portion 122 of the reactor effluent stream 120 forms a recirculated wastewater stream 122 and is directed back to the equalization tank where it combines with the stream of wastewater to be treated 110 and is further fed back to the reverse osmosis device 106. Another portion of the reactor effluent stream 120 forms a reactor discharge stream 124 which is blended with the treated wastewater stream 116 and together form the stream of treated wastewater 126 to be discarded from the system into the environment.

The main target in the present application is not removing all the organics in the reverse osmosis reject stream, but rather removing only portion of the organic contaminants in the wastewater through electro-oxidation to prevent super-concentrating the oxidizable pollutants in the wastewater being recycled back to the reverse osmosis unit 106 and at the same time controlling the total dissolved solids (TDS) concentration in the wastewater being recycled back to reverse osmosis unit and to the electrochemical reactor. The TDS concentration is controlled to increase the conductivity of the wastewater being treated, for example by controlling the amount of sodium sulfate (Na2SO4), the amount of a pH control solution, for example sodium hydroxide (NaOH) and/or the amount of an antiscalant or biocide solution for maintaining the condition of the membrane of the reverse osmosis unit, and it is also controlled to reduce the amount of undesirable inorganic dissolved solids in the wastewater to be treated, for example fluoride or those inorganic dissolved solids that increase the wastewater hardness. At the same time, the target of the present application is improving the efficiency of the electrochemical oxidation reactor which is measured by the achieved contaminant removal rate and energy/current efficiency and which depends on the concentration of the organic contaminants in the wastewater to be treated. This helps maintain a lower cost for the reactor which requires a smaller active area for treating only a controlled amount of organics while recycling a portion of the organic compounds back to the reverse osmosis unit.

This is done by controlling the fraction ratio between the volume of the recirculated wastewater stream 122 and the volume of the reactor discharge stream 124 based on the composition of the wastewater to be treated, respectively on the target total dissolved solids of the wastewater being treated, on the target concentration of organic compounds and more specifically on the concentration of organic compounds which are treated in the electrochemical oxidation reactor to achieve a controlled efficiency of the reactor and on the allowable composition of the water being discarded in the environment. The target total dissolved solids in the wastewater to be treated comprises desirable inorganic dissolved solids in the stream of wastewater to be treated (e.g. sulfates or other compounds which increase the conductivity of the wastewater to be treated) and undesirable inorganic dissolved solids in the stream of wastewater to be treated (e.g. scale forming compounds, halides, compounds which increase the wastewater hardness, for example fluorides).

The control of the volume of the recirculated wastewater stream 122 and of the volume of the reactor discharge stream 124 according to the above parameters is done through control means (shown with dashed lines) which include standard equipment such as a controller and valves for regulating the flow of the reactor discharge stream and of the recirculated wastewater stream.

The control of the volume of the recirculated wastewater stream and the reactor discharge stream can be done at a fixed rate based on the modelling done in the lab using a numerical model that uses the composition of the wastewater to be treated and the characteristics of the membrane of the reverse osmosis device and of the electrochemical oxidation reactor or it can be done continuously by monitoring the total dissolved solids amount in the stream of wastewater to be treated 110, the amount of organic compounds in the stream of wastewater to be treated 110, in the reverse osmosis reject stream 118, in the electrochemical oxidation reactor 108 and in the reactor effluent stream 120 and the composition of the wastewater being discharged from the system.

By treating only a portion of the organic contaminants from the wastewater in the electrochemical oxidation reactor and by recycling a portion of the pH and conductivity control solutions back into the treatment cycle, the size of the entire system can be reduced while achieving big savings in regards to the cost of the equipment employed in the system and the energy being consumed.

The method for operating the present system described above and illustrated in FIG. 1 can be summarized as follows. The wastewater stream to be treated is supplied to the equalization tank 102 and the effluent wastewater stream 112 is supplied to the pre-treatment unit 104 where it is treated to improve its conductivity for example, or as described above to add solutions for controlling the pH of the wastewater and/or solutions to prevent the membrane fouling, and the stream of pre-treated wastewater 114 is supplied to a membrane filtration device, for example a reverse osmosis device 106. The reject stream 118 is supplied to the electrochemical oxidation reactor 108 and the reactor effluent stream 120 is divided into a reactor discharge stream 124 and into a recirculated wastewater stream 122 according to a controlled fraction ratio which is determined according to one of the control methods described above. The reactor discharge stream 124 is merged with the treated wastewater stream 116 coming out from the reverse osmosis device 106 and they form the stream of wastewater 126 which is discarded from the system.

Figure 2:
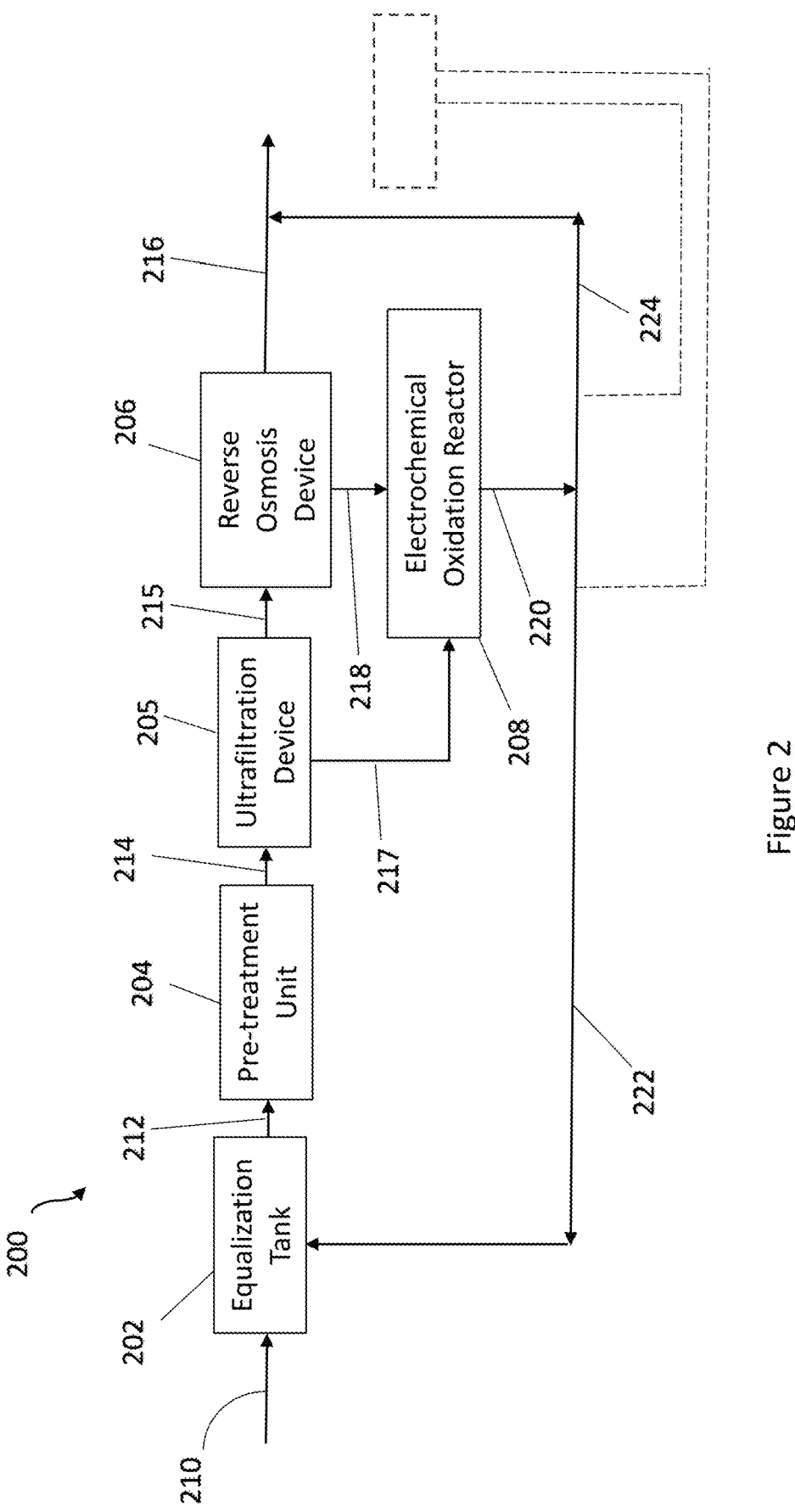
FIG. 2 illustrates a schematic of the second embodiment of the system for treating wastewater according to the present invention.

The second embodiment of the present invention is illustrated in FIG. 2. The electrochemical wastewater treatment system 200 of this second embodiment comprises an equalization tank 202, a pre-treatment unit 204, and ultrafiltration device 205, a reverse osmosis device 206 and an electrochemical oxidation reactor 208.

The stream of wastewater to be treated 210 is fed to the equalization tank 202 and the effluent wastewater stream 212 from the equalization tank is pre-treated in the pre-treatment unit 204. The stream of pre-treated wastewater 214 exiting unit 204 is fed to the ultrafiltration device 205 and the stream of ultrafiltrated treated water 215 is fed to the reverse osmosis device 206. Similar to the first embodiment, in the pre-treatment unit the wastewater is pre-treated by adding solutions for increasing the wastewater conductivity, solutions for controlling the pH of the wastewater and/or solutions to prevent the membrane fouling such as a descalant, dechlorinator or biocides.

The stream of pre-treated wastewater 214 is first treated in the ultrafiltration device 205 for separating selected soluble and insoluble compounds that could be the same or different than the compounds filtrated by the reverse osmosis device 206 and this helps prevent the fouling of the reverse osmosis unit 206. A person skilled in the art can easily understand that another reverse osmosis device, a nanofiltration device or any other membrane filtration device such as a microfiltration or an ultrafiltration device could be used instead of ultrafiltration device 205 or instead of the reverse osmosis device 206. The stream of ultrafiltrated treated water 215 is further treated in the reverse osmosis device by separating selected soluble and insoluble compounds, including organic compounds to form a treated wastewater stream 216. The wastewater that is rejected from the reverse osmosis device forms a reverse osmosis reject stream 218 and the wastewater that is rejected from the ultrafiltration device 205 forms an ultrafiltration reject stream 217. Both the ultrafiltration reject stream 217 and reverse osmosis reject stream 218 are fed to the electrochemical oxidation reactor 208 where the wastewater is electrochemically treated by electro-oxidation and the electrochemically treated wastewater exits the reactor forming a reactor effluent stream 220. The electrochemical oxidation reactor can comprise several electrochemical cells which can use different catalysts for removing specific contaminants in the wastewater, especially specific organic compounds in the wastewater. As in the first embodiment, electrochemical oxidation reactor 208 is not treating the entire amount of organics from the wastewater to be treated but rather only a controlled amount of organics, while recycling a portion of the organic compounds back to the reverse osmosis unit and therefore requires a smaller active area which brings considerable cost savings to the system.

A portion of the reactor effluent stream 220 forms a recirculated wastewater stream 222 and is directed back to the equalization tank where it combines with the stream of wastewater to be treated 210 and is further fed back to the pre-treatment unit 204 and further to the ultrafiltration device 205 and reverse osmosis device 206. Another portion of the reactor effluent stream 220 forms a reactor discharge stream 224 which is blended with the treated wastewater stream 216 and forms the stream of treated wastewater 226 to be discarded from the system.

The method of controlling the fraction ratio between the volume of the reactor discharge stream 224 and the volume of the recirculated wastewater stream 222 is done in a similar way with the control method applied in the first embodiment, based on the composition of the wastewater to be treated 210, respectively on the target total dissolved solids (TDS) in the stream of wastewater to be treated 210, the target concentration of organic compounds which are treated in the electrochemical oxidation reactor 208 to achieve a controlled efficiency of the reactor and on the allowable composition of the treated wastewater stream 226 being discarded from the system. The target total dissolved solids (TDS) depends on the concentration of desirable inorganic dissolved solids in the stream of wastewater to be treated 210 (e.g. sulfates or other compounds which increase the conductivity of the wastewater to be treated) and on the concentration of undesirable inorganic dissolved solids in the stream of wastewater to be treated 210 (e.g. scale forming compounds, halides, compounds which increase the wastewater hardness, for example fluorides).

The control of the flow for the recirculated wastewater stream 222 and reactor discharge stream 224 is done through control means (not illustrated) which comprise a controller and flow valves and can be done at a fixed rate based on calculation results from a numerical model that uses the composition of wastewater to be treated or it can be done continuously by monitoring the concentration of these compounds in the system during operation, similarly to the procedure described for the first embodiment.

The method for operating the system illustrated in FIG. 2 can be summarized as follows. The wastewater stream to be treated 210 is supplied to the equalization tank 202 and the effluent wastewater stream 212 is supplied to the pre-treatment unit 204 where it is treated to improve its conductivity for example, or as described above to add solutions for controlling the pH of the wastewater and/or solutions to prevent the membrane fouling, and the stream of pre-treated wastewater 214 is supplied to a first membrane filtration device, the ultrafiltration device 205 and the stream of ultra-filtrated treated wastewater 215 is further supplied to a second membrane filtration device, the reverse osmosis device 206. The ultrafiltration reject stream 217 and the reverse osmosis reject stream 218 are supplied to the electrochemical oxidation reactor 208 and the reactor effluent stream 220 is divided into a reactor discharge stream 224 and into a recirculated wastewater stream 222 according to a controlled fraction ratio which is determined according to the control method described above. The reactor discharge stream 224 is merged with the treated wastewater stream 216 coming out from the reverse osmosis device 206 to form the stream of treated wastewater 226 to be discarded from the system.

Figure 3:
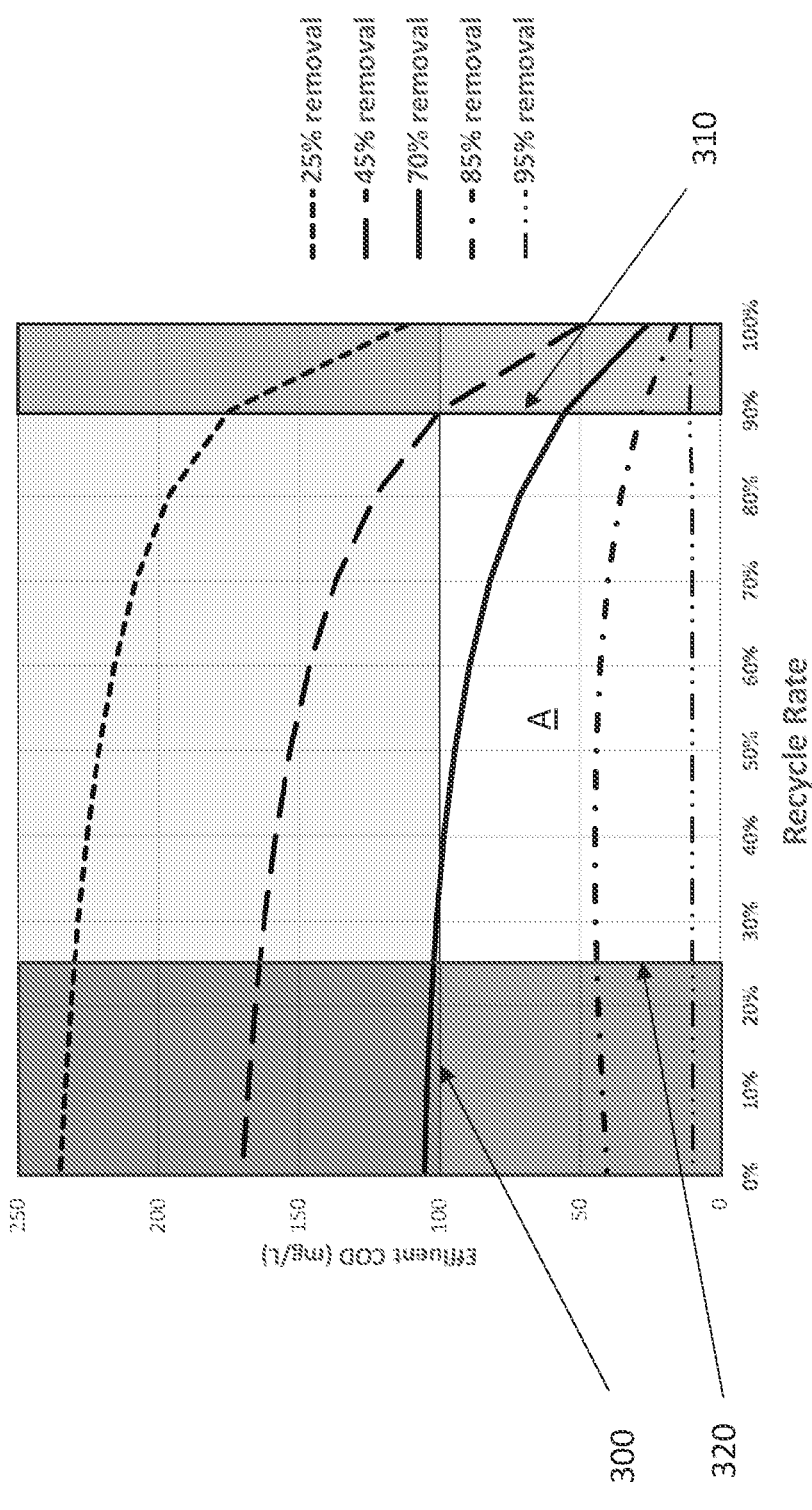
FIG. 3 illustrates an example of data supporting how a fraction ratio between the volume of the recirculated wastewater stream from the electrochemical oxidation reactor to the membrane filtration device and the volume of the reactor discharge stream can be selected according to the present invention.

FIG. 3 illustrates a graph showing how the fraction ratio between the volume of the recirculated wastewater stream from the electrochemical oxidation reactor to the membrane filtration device and the volume of the reactor discharge stream depends on the composition of the wastewater to be treated, on the target total dissolved solids, and on the allowable composition of the wastewater to be discarded as described in the present invention.

FIG. 3 was obtained based on modelling and testing of wastewater in a system according to the present invention based on the following parameters:

a stream of wastewater to be treated with 300 mg/L COD, 500 mg/L total dissolved solids (TDS), and a flow rate of 10 m³/day;

a reverse osmosis device with a recovery rate of 75%; and five sizes of electrochemical oxidation reactors having different removal rates of organic compounds, from 25% removal rate to 95% removal rate measured in systems without any wastewater recycling.

A person skilled in the art would understand that the removal rate of the electrochemical oxidation reactors is based on the active area of each reactor, such that the reactor with a higher removal rate of organic compounds would have a larger active area, respectively catalyst coated electrolytic area, and therefore would be more expensive. The graph illustrates the COD (chemical oxygen demand) in the treated wastewater stream which is discarded into the environment (effluent COD) which would be obtained for different fraction ratios (recycle rates) and for several different sizes of electrochemical oxidation reactors with different removal rates (25%, 50%, 70%, 85% and 95%).

As seen in the graph illustrated in FIG. 3, in this example the stream of wastewater discarded from the system has to have an effluent COD (chemical oxygen demand) of 100 mg/L, which illustrates the regulatory requirements imposed on the amount of contaminants in the stream of treated wastewater 126 and respectively 226 to be discarded in the environment. The limitation of 100 mg/l in effluent COD is illustrated in FIG. 3 by line 300.

Another restriction when choosing the recycle rate and respectively the fraction ratio between the wastewater to be recycled and the wastewater to be discharged is preventing the fouling of the membrane filtration device in the system. For this model wastewater, a recycle rate of over 90% (as illustrated in the graph by line 310) would trigger the fouling of the membrane filtration device and/or of the reactors.

Based on testing it was found that having a total dissolved solids (TDS) of 2,500 mg/L in the wastewater to be treated means that no electrolyte has to be added during treatment, and the testing has shown that a recycle rate over 25% as illustrated by line 320, is sufficient to provide this required TDS amount.

Based on these requirements, the area on the graph delimited by the lines 300, 310 and 320, indicated as "A" shows that a system using a reactor sized for 70% removal rate would have to use a fraction ratio (recycle rate) of between 40% and 90%. Reactors sized for 85% and 95% removal rate would use a fraction ratio (recycle rate) of between 25% and 90%. According to the present invention, the reactor sized for 70% removal rate with a recycle rate of between 40% and 90% is chosen for operating the present system because considerable savings can be achieved by using a smaller reactor having a smaller active area.

Based on the experiments done on a system operating according to the parameters illustrated in FIG. 3, the fraction ratio is chosen within the range of 40% to 90% taking in consideration factors such as the required TDS for preventing the fouling of the membrane in the membrane filtration device and for providing the required conductivity, the allowable effluent COD and based on the reactor size which is based on the amount of organics in the wastewater to be treated.

Even if an equalization tank is illustrated in all the figures presented herein, a person skilled in the art would understand, based on the teachings of the present disclosure, that an equalization tank is not required in all embodiments.

Similarly, even if a pre-treatment unit can be present in preferred embodiments, a person skilled in the art would understand that a pre-treatment unit is not required in embodiments where the wastewater conductivity or the membrane fouling is not a concern.

Even if the reactor discharge stream from the electrochemical oxidation reactor is shown in all the figures as being combined with the treated wastewater stream exiting the reverse osmosis device a person skilled in the art would understand that the two streams, the reactor discharge stream and the treated wastewater stream from the reverse osmosis device can be discarded separately out of the present system.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

We claim:

1. A wastewater treatment system comprising:
a. first membrane filtration device configured to receive a stream of wastewater to be treated, wherein the stream of wastewater to be treated contains organic and inorganic compounds and the first membrane filtration device is capable of generating a first reject stream and a first treated wastewater stream which is discarded from the system; and
b. an electrochemical oxidation reactor configured to receive the first reject stream from the first membrane filtration device, wherein the electrochemical oxidation reactor is configured to remove a portion of the selected organic compounds from the first reject stream and thereby generate a reactor effluent stream,
wherein the reactor effluent stream is divided into a recirculated wastewater stream which is directed back to the first membrane filtration device and a reactor discharge stream which is discarded from the system.

2. The system of claim 1 wherein the first membrane filtration device is a reverse osmosis device.

3. The system of claim 1 further comprising a second membrane filtration device configured to receive the stream of wastewater to be treated before it is delivered to the first membrane filtration device, wherein the second membrane filtration device generates a second treated wastewater stream which is directed to the first membrane filtration device, and a second reject stream which is directed to the electrochemical oxidation reactor.

4. The system of claim 3 wherein the second membrane filtration device is an ultrafiltration device.

5. The system of claim 3 wherein the first membrane filtration device or the second membrane filtration device comprises a membrane which is selected to remove selected organic compounds from the stream of wastewater to be treated.

6. The system of claim 1 further comprising a control means for adjusting the volume of the reactor discharge stream and the volume of the recirculated wastewater stream at a ratio which depends on the amount of inorganic compounds a in the stream of wastewater to be treated, on the concentration of organic compounds in wastewater to be treated, and/or on the composition of the wastewater being discharged from the system.

7. The system of claim 6 wherein the amount of inorganic substances measured in the wastewater to be treated comprise an amount of desirable inorganic substances and an amount of undesirable inorganic substances, wherein the desirable inorganic substances in the wastewater to be treated increase the conductivity of the wastewater to be treated, and the undesirable inorganic substances in the wastewater to be treated comprise scale forming compounds or halides.

8. The system of claim 6 wherein target concentration of the organic compounds in the wastewater to be treated is based on the amount of organic substances in the wastewater which are treated by the electrochemical oxidation reactor to increase the efficiency of the electrochemical oxidation reactor to a target value determined based on the contaminant removal rate and the amount of current and energy consumed to operate the electrochemical oxidation reactor.

9. The system of claim 6 wherein the fraction ratio is continuously adjusted based on the total dissolved solids in the stream of wastewater to be treated, on the concentration of organic compounds in the stream of wastewater to be treated and/or on the composition of the wastewater being discharged from the system.

10. The system of claim 1 further comprising an equalization tank, wherein the stream of wastewater to be treated is directed to the equalization tank before it is directed to the first membrane filtration device, or wherein the stream of wastewater to be treated is directed to the equalization tank and then to a pre-treatment unit before it is directed to the first membrane filtration device.

11. A method for wastewater treatment by membrane filtration and electrochemical oxidation comprising the steps of:

a. supplying a stream of wastewater to be treated to a membrane filtration device, discharging a reject stream from the membrane filtration device, and discarding a stream of wastewater which was treated in the membrane filtration device out of the system;

b. supplying the reject stream from the membrane filtration device to an electrochemical oxidation reactor which treats the reject stream to remove only a portion of specific organics therefrom and generating a reactor effluent stream which is discharged from the electrochemical oxidation reactor;

c. supplying a portion of the reactor effluent stream back to the membrane filtration device as a recirculated wastewater stream and discarding the rest of the reactor effluent stream as a reactor discharge stream out of the system or merging it with the stream of wastewater treated in the membrane filtration device to be discarded out of the system; and d. controlling the ratio between volume of the recirculated wastewater stream from the electrochemical oxidation reactor to membrane filtration device and the volume of the reactor discharge stream.

12. The method of claim 11 wherein the ratio between the volume of the recirculated wastewater stream from the electrochemical oxidation reactor to the membrane filtration device and the volume of the reactor discharge stream is determined by the total dissolved solids in the stream of wastewater to be treated, by the concentration of organic compounds in the stream of wastewater to be treated, and/or by the composition of the wastewater being discharged from the system.

13. The method of claim 12 wherein the total dissolved solids in the stream of wastewater to be treated is determined by the amount and type of inorganic substances within the stream of wastewater to be treated.

14. The method of claim 13 wherein the amount of inorganic substances measured in the wastewater to be treated comprise an amount of desirable inorganic substances and an amount of undesirable inorganic substances, wherein the desirable inorganic substances in the wastewater to be treated comprise substances that increase the conductivity of the wastewater to be treated, and wherein the undesirable inorganic substances in the wastewater to be treated comprise scale forming substances or halides.

15. The method of claim 12 wherein the concentration of organic compounds is based on the amount of organic substances in the wastewater treated by the electrochemical oxidation reactor to increase efficiency of the electrochemical oxidation reactor to a value determined based on the contaminant removal rate and the amount of current and energy consumed to operate the electrochemical oxidation reactor.

16. The method of claim 11 wherein the ratio is continuously adjusted based on the total dissolved solids in the stream of wastewater to be treated, on the concentration of organic compounds in the stream of wastewater to be treated, and/or on the monitored composition of the stream of wastewater being discharged from the system.

* * * * *